Figure 1:
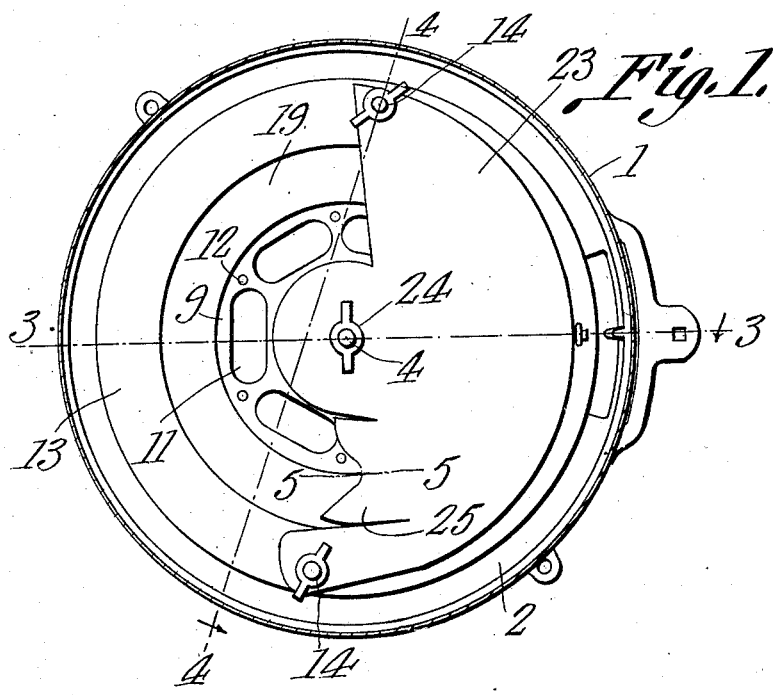

R. B. MAY.
PINDAL OR PEANUT PLANTER.
APPLICATION FILED JULY 6, 1910.

972,205.

Patented Oct. 11, 1910.

2 SHEETS—SHEET 1.

Robert B. May, Inventor

Witnesses by C. A. Snow & Co.
Attorneys.

R. B. MAY.
PINDAL OR PEANUT PLANTER.
APPLICATION FILED JULY 6, 1910.
972,205.
Patented Oct. 11, 1910.
2 SHEETS—SHEET 2.
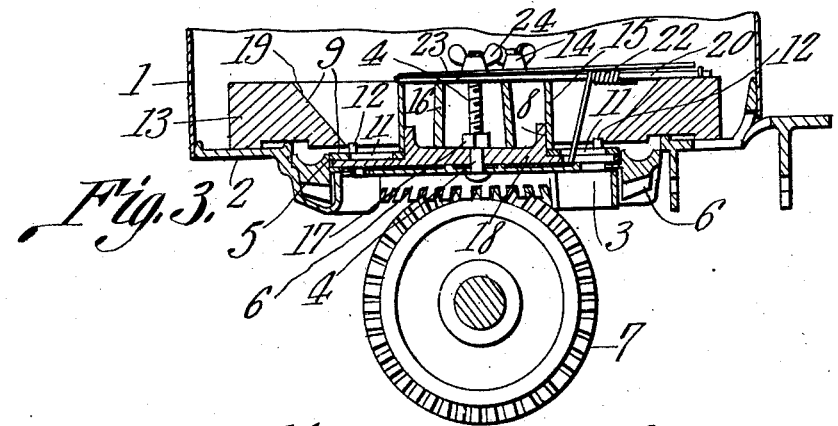
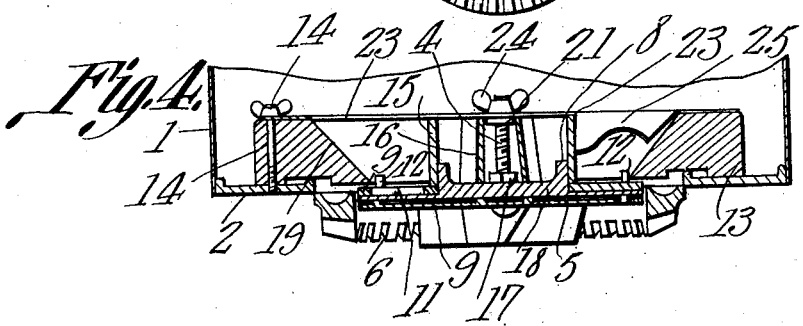
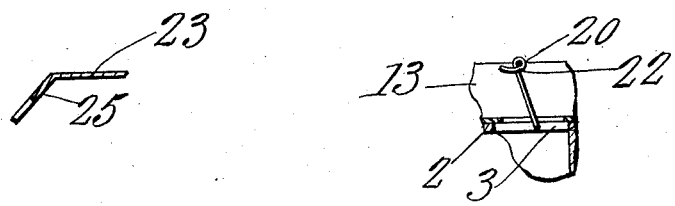
Witnesses
Robert B. May,
Inventor
by C. A. Snow & Co.
Attorneys

UNITED STATES PATENT OFFICE.

ROBERT BROWN MAY, OF STOCKDALE, TEXAS, ASSIGNOR OF ONE-HALF TO RICHARD M. WARE, OF STOCKDALE, TEXAS.

PINDAL OR PEANUT PLANTER.

972,205.

Specification of Letters Patent. Patented Oct. 11, 1910.

Application filed July 6, 1910. Serial No. 570,632.

*To all whom it may concern:*

Be it known that I, ROBERT B. MAY, a citizen of the United States, residing at Stockdale, in the county of Wilson and State of Texas, have invented a new and useful Pindal or Peanut Planter, of which the following is a specification.

This invention has relation to planters for pindal or peanut and similar nuts and it consists in the novel construction and arrangement of its parts hereinafter shown, described and claimed.

The object of the invention is to provide a simple mechanism adapted to be applied to the seed box of an ordinary planter whereby the said planter may be transformed from a grain planter into a planter especially adapted to be used in planting nuts of the character indicated.

With this object in view the device includes a disk having enlarged openings which are adapted to be substituted for the disk usually employed for planting seed and upon the provided disk is mounted a series of stirrers. The ordinary pivot bolt used within the seed box about which the seed disk rotates is supplanted by a bolt of considerable length and a ring and a sleeve is positioned on edge above the disk and surrounds the said pivot bolt. A second ring of considerable diameter is located within the seed box and is supported at its outer edge portion upon the bottom of the same. The inner edge of the last said ring is beveled or concaved and is disposed toward the openings in the plate carrying the stirrers. An ejecting means is supported at its outer portion upon the outer ring and at its inner portion upon the inner ring and is provided with a spring means adapted to forcibly eject the nuts from the openings in the disk when the said openings carrying the nuts arrive at the outlet in the bottom of the seed box. A hood or graduator is located over the opening in the seed box and rests upon the upper side of the outer ring and the inner ring above mentioned and is held in position by means of a wing nut screw threaded upon the upper end of a pivot bolt and by wing screws passing down through the outer ring and engaging threaded orifices provided in the bottom of the seed box. The hood is provided at a point above the path of movement of the perforations in the disk with an apron which is adapted to be bent up or down for the purpose of increasing or decreasing the transverse area between the said hood and the plate whereby the number of nuts which may pass under the hood may be regulated.

Figure 2:
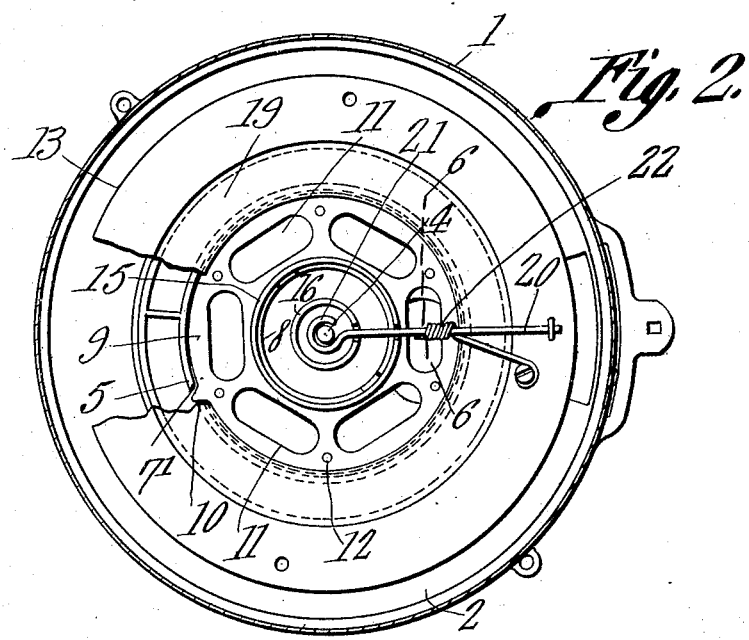

In the accompanying drawings: Figure 1 is a top plan view of the pindal planter. Fig. 2 is a top plan view of the same with parts broken away and the hood removed. Fig. 3 is a transverse sectional view of the pindal planter cut on the line 3—3 of Fig. 1. Fig. 4 is a transverse sectional view of the planter cut on the line 4—4 of Fig. 1. Fig. 5 is a transverse sectional view of a portion of the hood of the planter cut on the line 5—5 of Fig. 1. Fig. 6 is a transverse sectional view of a portion of the planter cut on the line 6—6 of Fig. 2.

As above stated the object of the present invention is to provide means for transforming an ordinary seed planter into a planter especially adapted to be used for planting pindal and other nuts and therefore just so much of the ordinary planter as in necessary to carry into execution the present invention is shown and described.

The reference character 1 indicates the side of an ordinary seed box which in turn is provided with a bottom 2. The bottom 2 is provided with an outlet opening 3. The bottom 2 is provided at its center with a pivot bolt 4. A gear plate 5 is journaled for rotation upon the pivot bolt 4 and is provided at its under side with an annular set of gear teeth 6 which are adapted to be engaged by a bevel pinion 7 in the usual manner whereby the said plate is rotated. The plate 5 is provided upon its upper edge and at suitable intervals with notches 7' best shown in Fig. 2 of the drawings and is provided at its center with an annular upstanding boss 8. The parts heretofore described are those usually included in an ordinary seed planter and the combination of parts to be hereinafter described constitute the principal features of the present invention. An annular disk 9 is provided at its periphery with projections 10 which are adapted to lie in the notches 7' provided in the plate 5. The said disk 9 is provided with a series of enlarged elongated openings 11 between the adjacent ends of which the said disk is provided with upstanding stirring pins 12. An annular ring 13 of considerable breadth and thickness is secured at its outer edge portion to the bottom 2 of the box 1 and is held in place by means of wing screws 14 which pass transversely through the said ring 13 and enter internally threaded orifices provided in the bottom 2 of the box 1 as illustrated at the left hand side of Fig. 4. A ring 15 receives the boss 8 and surrounds the pivot pin 4. A second ring or sleeve 16 is located upon the central portion of the bottom 2 of the box 1 and also surrounds the pivot pin 4. A nut 17 is screw threaded upon the lower portion of the pivot pin 4 and is adapted to hold the said pin in such position that the plate 18 at the center of the bottom 2 through which the said pivot pin passes holds the gear plate 5 in proper position. The inner edge of the ring 13 is beveled or concaved as at 19 and slopes downwardly toward the openings 11 provided in the disk 9. A radially disposed rod 20 is supported at its outer end upon the upper portion of the ring 13 and is provided at its inner end with an eye or loop 21 which receives the pivot bolt 4 in the manner illustrated in Fig. 2 of the drawings. A spring 22 is coiled upon the intermediate portion of the rod 20 and is attached at one end to the upper side of the ring 13 and the other end portion of the said spring 22 extends downwardly and is adapted to drag upon the upper surface of the disk 4 at the ends of the openings 11 and when the said openings are passing under the said spring the lower end thereof is adapted to project through the openings. A hood 23 in the form of an approximately semicircular disk rests at its outer edge portion upon the upper surface of the ring 13 and is secured by means of the wing screws 14 above referred to. A wing nut 24 is screw threaded upon the upper end of the pivot bolt 4 which passes through the inner edge portion of the hood 23 and the said wing nut 24 holds the intermediate portion of the said hood in position upon the upper edge of the ring 15. The hood 23 is provided at a portion between its outer edge and the pivot bolt 4 with an apron 25 which may be bent up or down in order to increase or diminish the passage space between the rings 13 and 15 whereby the number of nuts which may be permitted to pass under the hood may be regulated.

In operation the nuts are placed in the box 1 and the gear plate 5 is rotated by means of the bevel pinion 7 in the usual manner. As the disk 9 is carried around by the plate 5 in the manner indicated the nuts are agitated by the stirring pins 12 and the openings 11 receive one or more nuts. As the openings 11 pass under the apron 25 of the hood 23 the superfluous nuts are swept away from those which are located or carried directly by the opening 11 and as the opening 11 carrying the nuts approaches the opening 3 in the bottom 2 of the box 1 that portion of the disk 9 at the end of the opening 11 which is approaching the lower end of the spring 22 will engage the end of said spring and bends the same away from the opening 11 which is bringing the nuts toward the spring. As the opening 11 carrying the nuts becomes positioned over the opening 3 in the bottom 2 of the box 1 the end of the said opening 11 passes beyond the lower end of the spring 22 and the said lower end of the said spring under the tension thus accelerated moves in a downward direction and strikes the nuts carried in the opening 11 which has become positioned over the opening 3 in the bottom 2 of the seed box 1. Thus the nuts are forcibly ejected from between the edges of the opening 11 and fall down through the opening 3 in the bottom 2 of the seed box 1. This operation is repeated as each succeeding opening 11 approaches the spring 22 and opening 3. By bending the apron 25 to any desired height the number of nuts which may be carried by the openings 11 may be regulated.

Having described the invention what I claim as new and desire to secure by Letters Patent is;—

A pindal planter including in combination with a box having an opening in its bottom, a disk provided with openings and mounted for rotation upon the bottom of the box, upstanding pins carried by the disk, means for rotating the disk, a relatively broad and thick ring secured at its edge portion upon the bottom of the box and having its inner edge inclined toward the openings in the disk, a hood mounted at its edge portion upon the ring and having an apron located above the path of movement of the openings in the disk, a radially disposed rod mounted at its outer end portion upon the said ring and supported at its inner end portion at the center of the disk, a spring coiled at its intermediate portion about the said rod and fixed at its upper outer edge to the said ring and having its inner end portion depending above the path of movement of the openings in the disk and of such length as to engage the disk at the ends of the openings therein.

In testimony that I claim the foregoing as my own, I have hereto affixed my signature in the presence of two witnesses.

ROBERT BROWN MAY.

Witnesses:
EUGENE HAUSMANN,
MERRILL W. SMITH.